US009057827B2

(12) United States Patent
Maetani et al.

(10) Patent No.: US 9,057,827 B2
(45) Date of Patent: Jun. 16, 2015

(54) OPTICAL TRANSMISSION STRUCTURE AND METHOD FOR MANUFACTURING THE SAME, AND OPTICAL TRANSMISSION MODULE

(75) Inventors: Maraki Maetani, Seika-cho (JP);
Takahiro Matsubara, Seika-cho (JP);
Yuji Masuda, Seika-cho (JP); Kaori Tanaka, Seika-cho (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/819,507

(22) PCT Filed: May 31, 2011

(86) PCT No.: PCT/JP2011/062464
§ 371 (c)(1),
(2), (4) Date: Feb. 27, 2013

(87) PCT Pub. No.: WO2012/029370
PCT Pub. Date: Mar. 8, 2012

(65) Prior Publication Data
US 2013/0156371 A1    Jun. 20, 2013

(30) Foreign Application Priority Data

| Aug. 31, 2010 | (JP) | 2010-193323 |
| Oct. 26, 2010 | (JP) | 2010-239545 |
| Jan. 31, 2011 | (JP) | 2011-017830 |
| Jan. 31, 2011 | (JP) | 2011-017832 |
| Feb. 23, 2011 | (JP) | 2011-037193 |

(51) Int. Cl.
*G02B 6/12* (2006.01)
*G02B 6/42* (2006.01)
(Continued)

(52) U.S. Cl.
CPC . *G02B 6/12* (2013.01); *G02B 6/138* (2013.01); *G02B 6/4214* (2013.01); *G02B 6/13* (2013.01)

(58) Field of Classification Search
CPC ............... G02B 6/12; G02B 6/42; G02B 6/43; G02B 6/138
USPC .................................................. 385/14, 31, 49
See application file for complete search history.

(56) References Cited

U.S. PATENT DOCUMENTS 5,712,941 A    1/1998  Imoto et al.
6,153,359 A *  11/2000 Shimizu et al. .............. 252/79.1
(Continued)

FOREIGN PATENT DOCUMENTS

JP    09-159846 A    6/1997
JP    2004-294857 A  10/2004
(Continued)

OTHER PUBLICATIONS

Japanese Office Action with English concise explanation, Japanese Patent Appln. No. 2012-531716, Apr. 23, 2013, 5 pp.
(Continued)

*Primary Examiner* — Charlie Y Peng
(74) *Attorney, Agent, or Firm* — Volpe and Koenig, P.C.

(57) ABSTRACT

Provided are an optical transmission structure having a high degree of flexibility in the design of an optical waveguide and a method for manufacturing the optical transmission structure, and also an optical transmission module. An optical transmission structure includes a main substrate (30), a cladding member (40), and core members (50). The main substrate (30) has a through hole (30a) penetrating therethrough in a thickness direction thereof. The cladding member (40) is disposed inside the through hole (30a) and has a plurality of optical waveguide holes (40a) penetrating therethrough in a thickness direction thereof. The core members (50) are disposed inside the plurality of optical waveguide holes (40a), respectively, and have a refractive index larger than the cladding member (40).

4 Claims, 13 Drawing Sheets

(51) Int. Cl.
*G02B 6/13* (2006.01)
*G02B 6/138* (2006.01)

(56) References Cited

U.S. PATENT DOCUMENTS

| | | | |
|---|---|---|---|
| 2005/0199013 A1* | 9/2005 | Vandroux et al. | 65/386 |
| 2006/0018590 A1 | 1/2006 | Murayama | |
| 2006/0263003 A1 | 11/2006 | Asai et al. | |
| 2008/0118199 A1 | 5/2008 | Asai et al. | |
| 2010/0172620 A1 | 7/2010 | Nanai | |
| 2010/0178018 A1* | 7/2010 | Augusto | 385/131 |
| 2010/0276664 A1* | 11/2010 | Hersee | 257/15 |
| 2010/0322551 A1* | 12/2010 | Budd et al. | 385/14 |
| 2011/0133061 A1* | 6/2011 | Yu et al. | 250/214.1 |
| 2011/0136288 A1* | 6/2011 | Duane et al. | 438/59 |

FOREIGN PATENT DOCUMENTS

| | | |
|---|---|---|
| JP | 2005-134451 A | 5/2005 |
| JP | 2006-039046 A | 2/2006 |
| JP | 2006-058327 A | 3/2006 |
| JP | 2006-078606 A | 3/2006 |
| JP | 2006078606 A * | 3/2006 |
| JP | 2008-298934 A | 12/2008 |
| JP | 2009-139758 A | 6/2009 |
| JP | 2010-096941 A | 4/2010 |
| WO | 2005/052666 A1 | 6/2005 |

OTHER PUBLICATIONS

Japanese Office Action with English concise explanation, Japanese Patent Appln. No. 2012-531716, Feb. 12, 2014, 6 pp.

* cited by examiner

FIG. 8
(a)
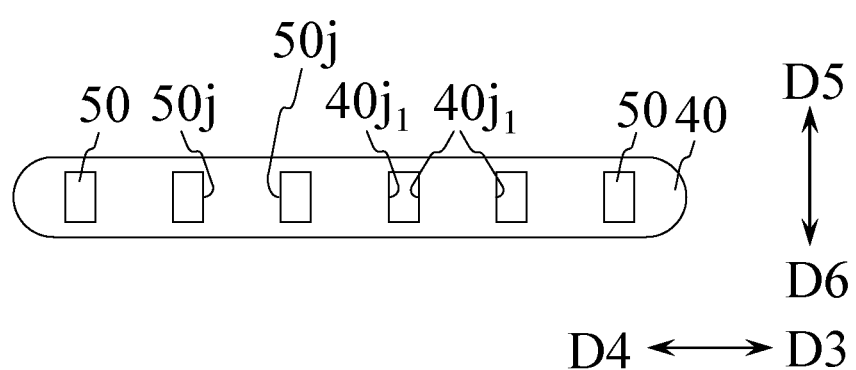
(b)
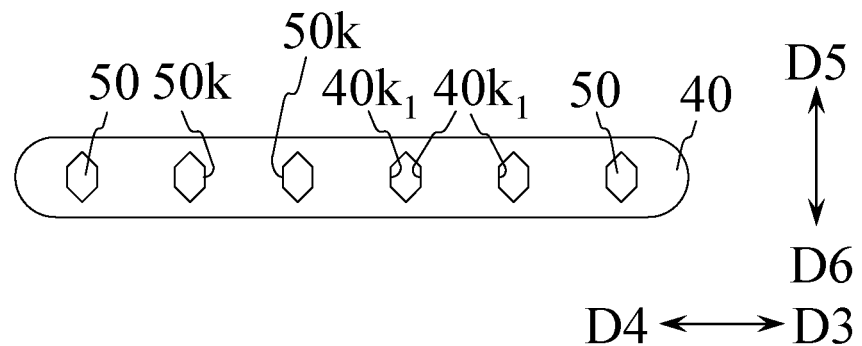
(c)
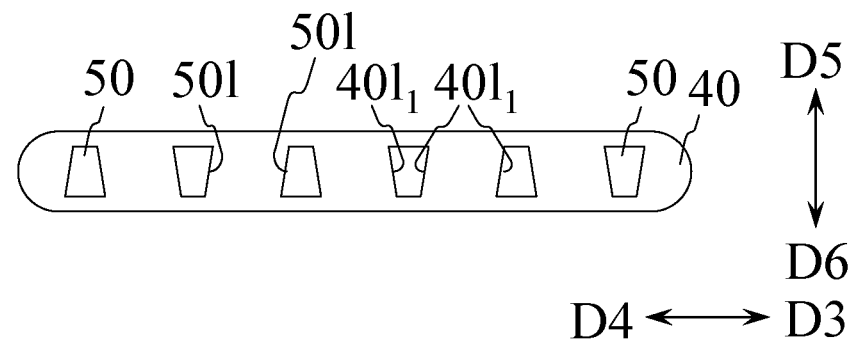

FIG. 9
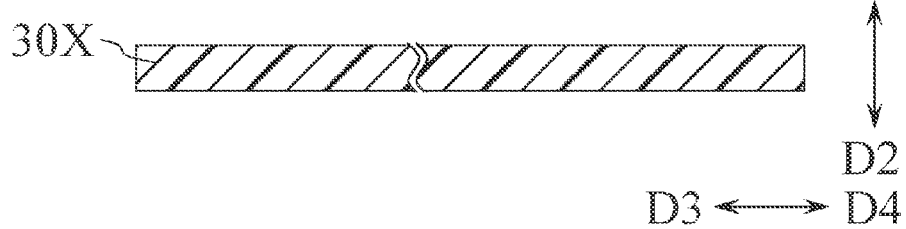
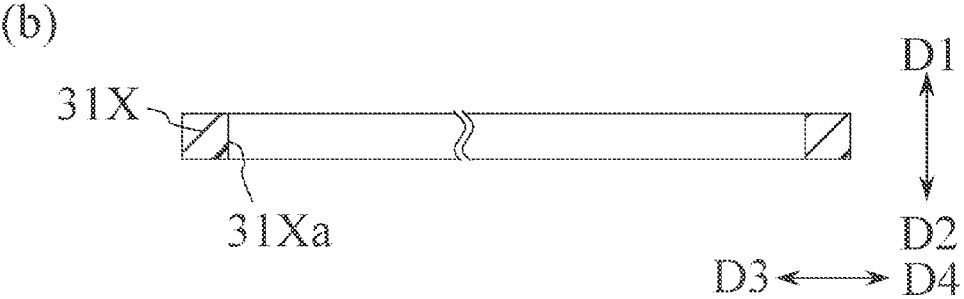
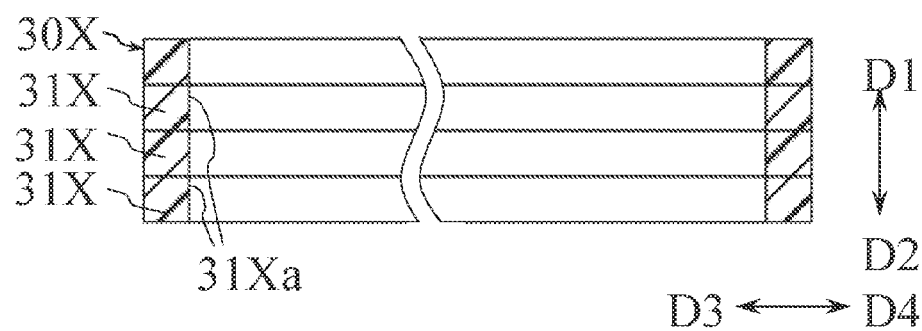
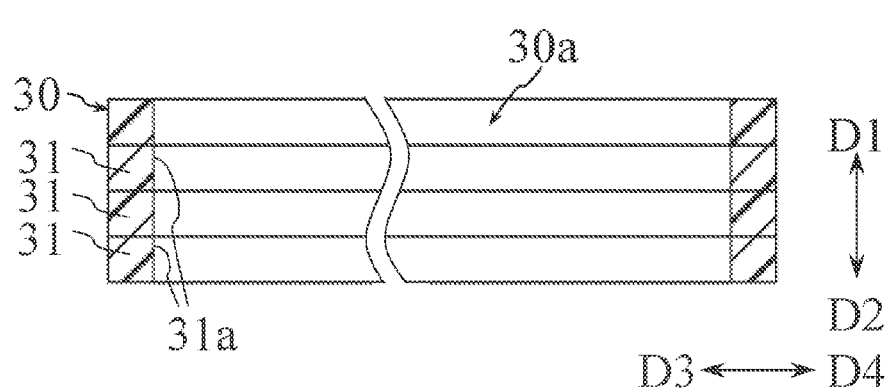

FIG. 17
(a)
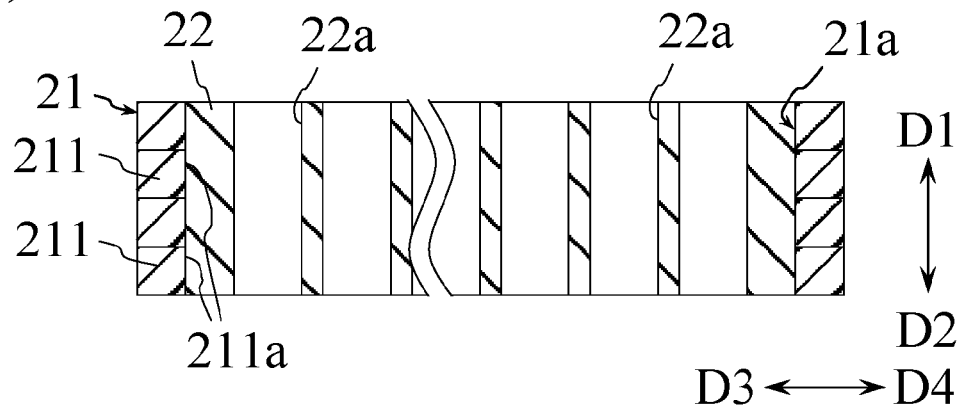
(b)
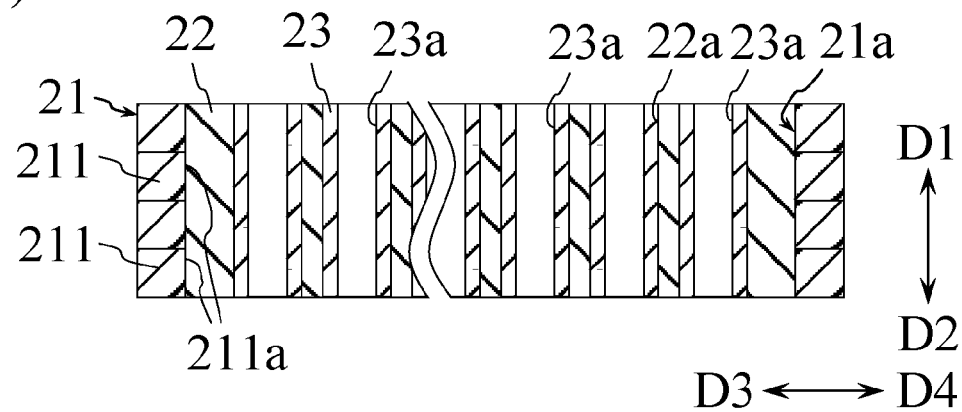
(c)
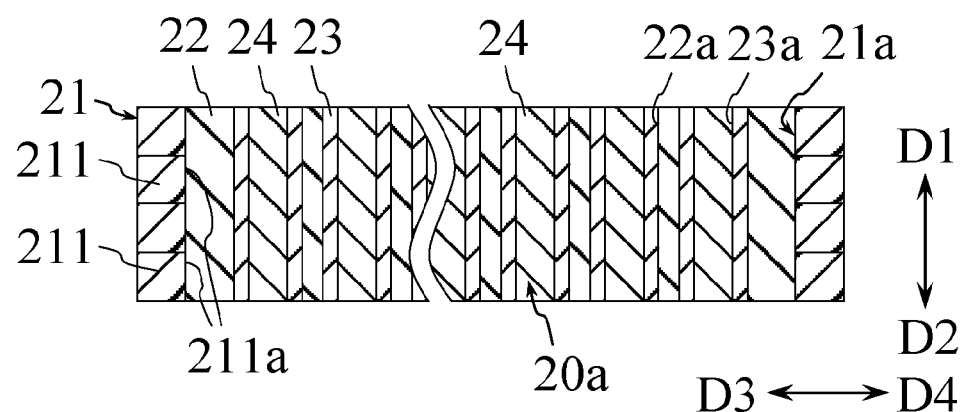

OPTICAL TRANSMISSION STRUCTURE AND METHOD FOR MANUFACTURING THE SAME, AND OPTICAL TRANSMISSION MODULE

TECHNICAL FIELD

The present invention relates to an optical transmission structure and a method for manufacturing the same, and an optical transmission module.

BACKGROUND ART

Recently, in the interest of enhancement in information processing capacity, researches and studies have been conducted as to replacement with an optical transmission system in regard to telecommunication between electrical devices such as integrated circuit components. For example, in Patent Literature 1, there is disclosed an optical transmission module constructed by mounting a plurality of optoelectronic conversion devices such as light-emitting devices in an optical transmission structure having a plurality of optical waveguides extending in the direction of substrate thickness. The optical waveguides are disposed in a plurality of through holes, respectively, formed so as to pass completely through the substrate in its thickness direction.

CITATION LIST

Patent Literature

Patent literature 1: Japanese Unexamined Patent Publication JP-A 2004-294857

SUMMARY OF INVENTION

Technical Problem

However, in the optical transmission structure disclosed in Patent literature 1, in light of dimensional deviation or positioning error such as misalignment that occurs during the forming of the through holes, and substrate strength as well, restrictions need to be imposed on the diameter, position, etc. of the optical waveguide.

The present invention has been devised in view of the circumstances as mentioned supra, and accordingly an object of the invention is to provide an optical transmission structure having a high degree of flexibility in the design of an optical waveguide and a method for manufacturing the optical transmission structure, and also an optical transmission module.

Solution to Problem

An optical transmission structure in accordance with a first embodiment of the invention includes: a substrate having a through hole penetrating therethrough in a thickness direction thereof; a cladding member which is disposed inside the through hole and has a plurality of optical waveguide holes penetrating therethrough in a thickness direction thereof; and a plurality of core members disposed in inside the plurality of optical waveguide holes, respectively.

An optical transmission module in accordance with an embodiment of the invention includes: the optical transmission structure mentioned above; and an optical device optically coupled to the second optical member.

An optical transmission structure in accordance with a second embodiment of the invention includes: a substrate having a plurality of through holes penetrating therethrough in a thickness direction thereof; a cladding member having an optical waveguide hole penetrating therethrough in the thickness direction and disposed inside at least one of the plurality of through holes; and a plurality of core members which are disposed inside the optical waveguide hole, and have a refractive index larger than the cladding member.

A method for manufacturing an optical transmission structure in accordance with the first embodiment of the invention includes: preparing a substrate having a through hole penetrating therethrough in a thickness direction thereof; filling a photosensitive material into the through hole; exposing a region of the photosensitive material filled other than a region thereof in overlapping relation with a plurality of light-shielding portions to light through a light-transmitting plate having the plurality of light-shielding portions for photosensitization, and then turning the photosensitized photosensitive material into a cladding member; forming a plurality of optical waveguide holes penetrating in the thickness direction in the cladding member by removing the region of the photosensitive material in overlapping relation with the light-shielding portion; and filling a core member made of a light-transmitting material which has a refractive index larger than the cladding member into the optical waveguide hole.

A method for manufacturing an optical transmission structure in accordance with the second embodiment of the invention includes: preparing a substrate having a plurality of through holes penetrating therethrough in a thickness direction thereof; filling a photosensitive material into at least one of the plurality of through holes; exposing a region of the photosensitive material filled other than a region thereof in overlapping relation with the light-shielding portion to light through a light-transmitting plate having a plurality of light-shielding portions for photosensitization, and then turning the photosensitized photosensitive material into a cladding member; forming a plurality of optical waveguide holes penetrating the photosensitive material in the thickness direction in the cladding member by removing the region of the photosensitive material in overlapping relation with the light-shielding portion; and filling a core member made of a light-transmitting material which has a refractive index larger than the cladding member into the optical waveguide hole.

Advantageous Effects of Invention

According to the invention, there are provided an optical transmission structure and an optical transmission module having an optical waveguide designed with higher dimensional accuracy and higher positional accuracy.

BRIEF DESCRIPTION OF DRAWINGS

FIG. 8 is a plan view showing part of a modified example of the first embodiment of the optical transmission structure shown in FIG. 7;

FIG. 9 is a main-part sectional view showing an example of a procedure for manufacturing the optical transmission structure shown in FIG. 4;

FIG. 17 is a main-part sectional view showing an example of a procedure for manufacturing the optical transmission structure shown in FIG. 15;

DESCRIPTION OF EMBODIMENTS

<First Embodiment of Optical Transmission Structure and Optical Transmission Module>

Hereinafter, an optical transmission structure 20 and an optical transmission module 10 that exemplify an optical transmission structure and an optical transmission module, respectively, according to a first embodiment of the invention will be described with reference to the drawings.

Figure 1:
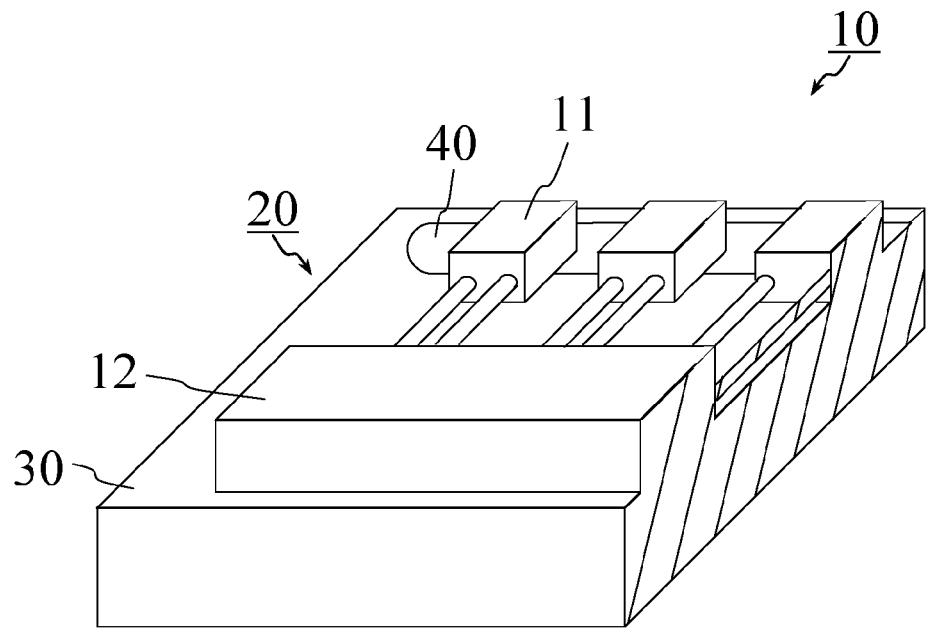
FIG. 1 is a partial perspective view showing the general constitution of a first embodiment of an optical transmission module pursuant to the invention.
Figure 2:
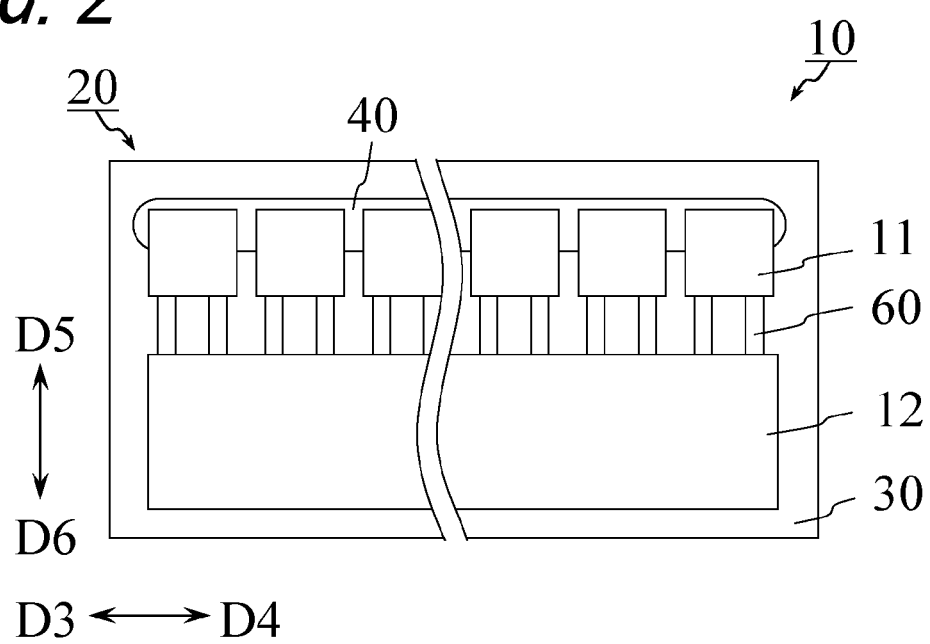
FIG. 2 is a plan view showing the general constitution of the optical transmission module shown in FIG. 1.

The optical transmission module 10 shown in FIGS. 1 and 2 includes the optical transmission structure 20, an optoelectronic conversion device 11 used as an optical device, and a circuit component 12.

Figure 3:
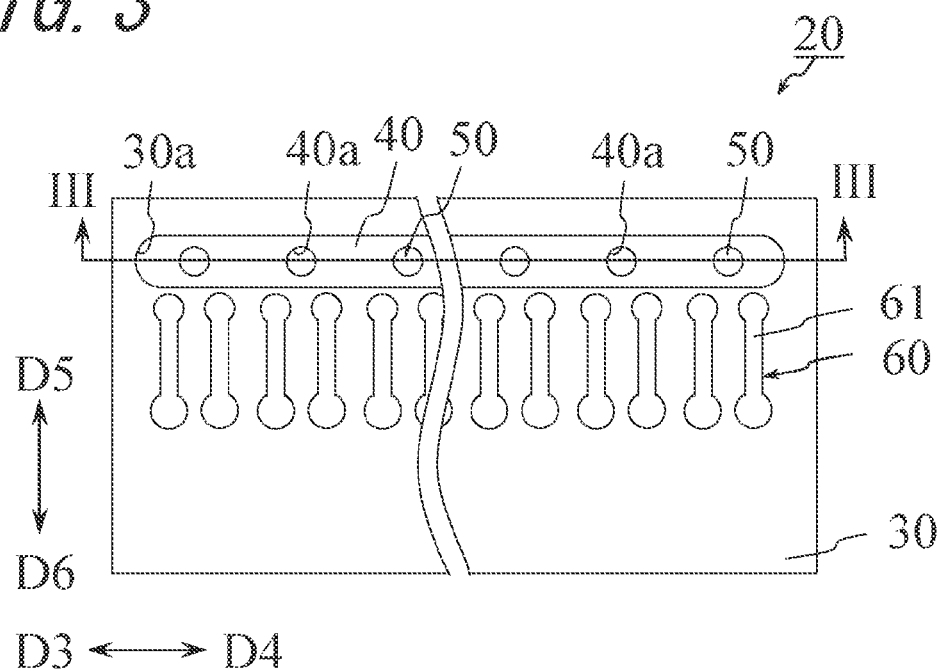
FIG. 3 is a plan view showing the general constitution of a first embodiment of an optical transmission structure constituting the optical transmission module shown in FIG. 1.
Figure 4:
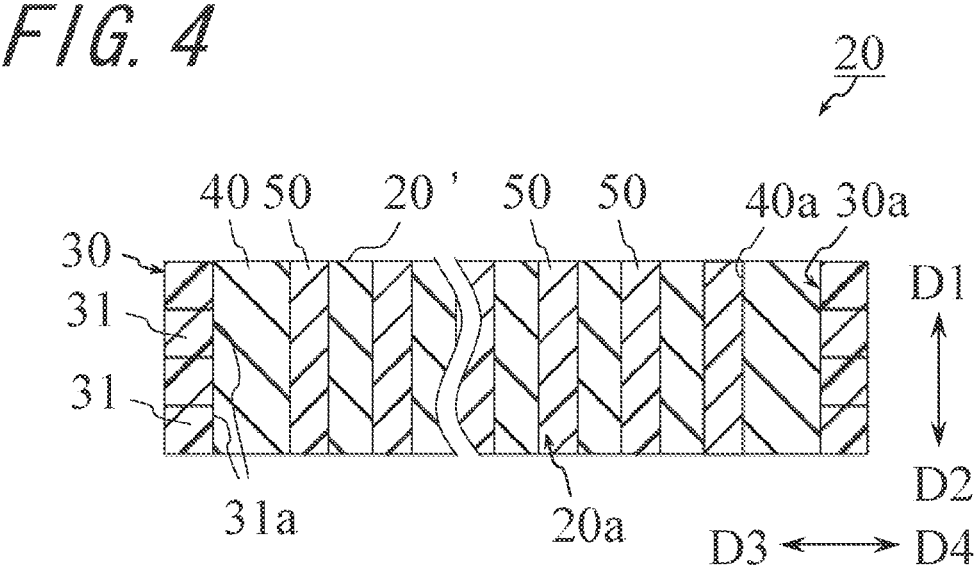
FIG. 4 is a sectional view taken along the line III-III shown in FIG. 2.

The optical transmission structure 20 shown in FIGS. 3 and 4 includes a main substrate 30, a cladding member 40, a plurality of core members 50, and an electric wiring 60.

The main substrate 30 acts to support the cladding member 40, the core members 50, and the electric wiring 60. For example, the thickness of the main substrate 30 may fall in the range of, for example, 0.1 mm or more and 2 mm or less. As the main substrate 30, for example, use can be made of an epoxy resin substrate formed of a glass base material, a copper-clad substrate formed of a glass base material, a polyimide resin substrate, and a ceramic substrate. The main substrate 30 is constructed of a single-layer substrate or a stacked body made of a stack of a plurality of substrates. In this embodiment, a plurality of ceramic substrates are employed. The main substrate 30 of this embodiment is constructed by stacking a plurality of secondary substrates 31 together.

As shown in FIG. 4, the main substrate 30 has a through hole 30*a* penetrating therethrough in a thickness direction thereof. The through hole 30*a* is composed of a series of secondary through holes 31*a* disposed in the secondary substrates 31. The secondary through holes 31*a* are disposed in the respective secondary substrates 31 so as to penetrate therethrough in the thickness direction. In FIG. 4, said thickness direction is defined as "a D1-D2 direction". In the interior of the through hole 31*a* is disposed the cladding member 40 in such a way as to fill the through hole 31*a*.

The cladding member 40 acts to support the plurality of core members 50 disposed in the interior thereof. The cladding member 40 has a plurality of through holes penetrating therethrough in a thickness direction thereof. Said plurality of through holes are each defined as an optical waveguide hole 40*a*. The optical waveguide holes 40*a* are arranged along one direction which is perpendicular to the thickness direction. Said one direction is defined as a first direction in this embodiment. In FIGS. 2 to 4, the first direction is defined as "a D3-D4 direction". Moreover, the first direction corresponds to the direction of the plane of the main substrate 30.

In each of the optical waveguide holes 40*a* is disposed the core member 50. That is, the plurality of core members 50 are arranged along the first direction (the D3-D4 direction), and each of them is so formed as to extend in the thickness direction (the D1-D2 direction). For example, the spacing between the core members 50 in the first direction may fall in the range of 62.5 μm or more and 250 μm or less. Moreover, for example, the diameter of the core member 50 along the first direction may fall in the range of 10 μm or more and 100 μm or less.

The core member 50 functions as an optical waveguide 20*a* of the optical transmission structure 20. A refractive index of the core member 50 is greater than a refractive index of the cladding member 40. In this way, so long as the refractive index of the core member 50 is greater than that of the cladding member 40, the core member 50 is able to serve as the optical waveguide 20*a*. That is, the cladding member 40 functions as a so-called cladding of the optical waveguide 20*a*, whereas the core member 50 functions as a core of the optical waveguide 20*a*. For example, the refractive index of the core member 50 may be so determined that the relative refractive index difference between the core member 50 and the cladding member 40 falls in the range of 0.8% or more and 4% or less.

In this construction, since the plurality of core members 50 are disposed in one through hole 30*a*, in contrast to a case where a single core member is disposed in one through hole, it is possible to reduce the center-to-center spacing between cores. That is, in the optical transmission structure 20 of this embodiment, only the cladding member 40 lies between two the optical waveguide holes 40*a*, wherefore the center-to-center spacing between cores can be reduced. Moreover, as practiced in this embodiment, the use of a multilayer ceramic substrate for the main substrate 30 makes it possible to increase the degree of tolerance for misregistration of the plurality of secondary substrates 31 in stacking operation.

A variety of resin materials may be used for the formation of the cladding member 40, and examples thereof include epoxy resin, acrylic resin, and polyimide resin. In this embodiment, a photosensitive resin is adopted as the material of formation of the cladding member 40. The use of a photosensitive resin makes it possible to form the optical waveguide hole 40*a* by means of photolithography.

In the case of forming the optical waveguide hole 40*a* by means of photolithography, for example, the following advantages are gained. The first advantage resides in the effect of minimizing relative positional deviation between the plurality of optical waveguide holes 40*a*. This is because the plurality of optical waveguide holes 40*a* can be formed simultaneously by a single exposure process. Minimization of positional deviation in the optical waveguide holes 40*a* makes it possible to achieve, when establishing optical connection with other different optical waveguide placed in a location spaced outward from the optical transmission structure 20, successful transmission of light propagating through the interior of the optical waveguide hole 40*a* to said other optical waveguide.

As a knowledge among those skilled in the art, it is preferable that the degree of relative positional deviation between a plurality of optical waveguides is less than or equal to 5 μm. In the case of employing the technique of photolithography, the positional deviation depends on positional deviation in masking portions of a photomask corresponding to the optical waveguide holes 40*a*. In general, a manufacturing error for the photomask can be kept at a level of less than 1 μm, wherefore the degree of positional deviation in the optical waveguide holes 40*a* can be reduced to 5 μm or less.

The second advantage resides in the effect of imparting smoothness to the inner wall of the optical waveguide hole 40*a*. This is because the optical waveguide hole 40*a* is formed by exploiting light which travels straightforward with high linearity. By rendering the inner wall surface of the optical waveguide hole 40*a* smooth, it is possible to lessen losses of light propagating through the interior of the optical waveguide hole 40*a*. As a knowledge among those skilled in the art, it is preferable that the roughness of the inner wall surface of the optical waveguide hole 40*a* is sufficiently low with respect to the wavelength of light propagating through the interior of the optical waveguide hole.

The electric wiring 60 is electrically connected to the optoelectronic conversion device 11 optically coupled to the core member 50. The electric wiring 60 includes a surface wiring layer 61 disposed on a surface of the main substrate 30 on the D1 direction side. The electric wiring 60 may further include a through conductor configured to penetrate through the secondary substrate 31, as well as an intermediate wiring layer disposed between two secondary substrates 31. The through conductor may either be shaped so that it is hollowed in the middle or be shaped so that it is filled with an electrically conductive paste or the like in the middle. The through conductor can be formed by means of plating, metal-film vapor deposition, electrically conductive resin injection, or otherwise.

As described above, the electric wiring 60 makes, at its surface wiring layer 61, electrical connection with the optoelectronic conversion device 11. The optoelectronic conversion device 11 of this embodiment is mounted on the surface wiring layer 61 of the electric wiring 60 by using a metal bump, an electrically conductive adhesive, or the like. Regions other than the juncture of the optoelectronic conversion device 11 and the surface wiring layer 61 may be covered with a protective layer.

The optoelectronic conversion device 11 has the function of emitting light in response to inputted electric signals, or the function of effecting conversion into electric signals in response to incident light. The optoelectronic conversion device 11 is optically coupled to the optical waveguide 20*a*. The optoelectronic conversion device 11 of this embodiment performs the function of transmitting optical signals to the optical waveguide 20*a* in response to electric signals inputted thereto through the electric wiring 60, or the function of transmitting electric signals to the electric wiring 60 in response to optical signals inputted thereto through the optical waveguide 20*a*.

As the optoelectronic conversion device 11 for emitting light as described above, a variety of light-emitting devices are applicable. For example, a vertical cavity surface emitting laser (VCSEL) can be used for the optoelectronic conversion device 11. As the optoelectronic conversion device 11 for receiving light, a variety of light-receiving devices, such as a photo diode (PD), are applicable. In the case of employing a PD as such a light-receiving device, it is desirable to use a fast-responsive device, for example, a PIN-PD.

The optoelectronic conversion device 11 may either be constructed of one element provided with a single photoelectric conversion section or be constructed of one element provided with a plurality of photoelectric conversion sections. The optoelectronic conversion device 11 of this embodiment is constructed of one element provided with a single photoelectric conversion section. A single photoelectric conversion section is so disposed as to be brought into correspondence with a single core member 50. Said single photoelectric conversion section is so disposed as to be brought into correspondence with a single optical waveguide 20*a*.

The circuit component 12 is electrically connected to the optoelectronic conversion device 11 through the electric wiring 60. The function of the circuit component 12 varies according to the function of the optoelectronic conversion device 11. Where the optoelectronic conversion device 11 functions to emit light, the circuit component 12 effects inputting of a modulated electric signal (modulation voltage) to the optoelectronic conversion device 11 for control of the luminescence intensity of the optoelectronic conversion device 11. On the other hand, where the optoelectronic conversion device 11 functions to receive light, the circuit component 12 converts the output of a current signal produced responsive to the intensity of an optical signal received by the optoelectronic conversion device 11 into a voltage signal and produces the voltage signal output.

The circuit component 12 may have the capability to control signal waveforms or the capability to remove noise components. In a case where electric-signal output from the optoelectronic conversion device 11 is small, it is advisable to impart signal amplification capability to the circuit component 12. This signal amplification capability may be possessed by the optoelectronic conversion device 11 in itself. Moreover, the circuit component 12 may also have the capability to perform logic operations and mathematical calculations.

Modified Example 1

As shown in FIG. 4, a main surface 20' of the optical transmission structure 20 may have the form of a flat surface. By making the main surface 20' of the optical transmission structure 20 as a flat surface, it is possible to facilitate the mounting of the optical device optically coupled to the core member 50. That is, in this case, since the optical device can be mounted on the main surface 20' of the optical transmission structure 20 with ease, when establishing optical connection of the optical device to the optical transmission structure 20, it is possible to suppress an optical loss which is likely to occur between the optical device and the optical transmission structure 20.

Modified Example 2

Figure 5:
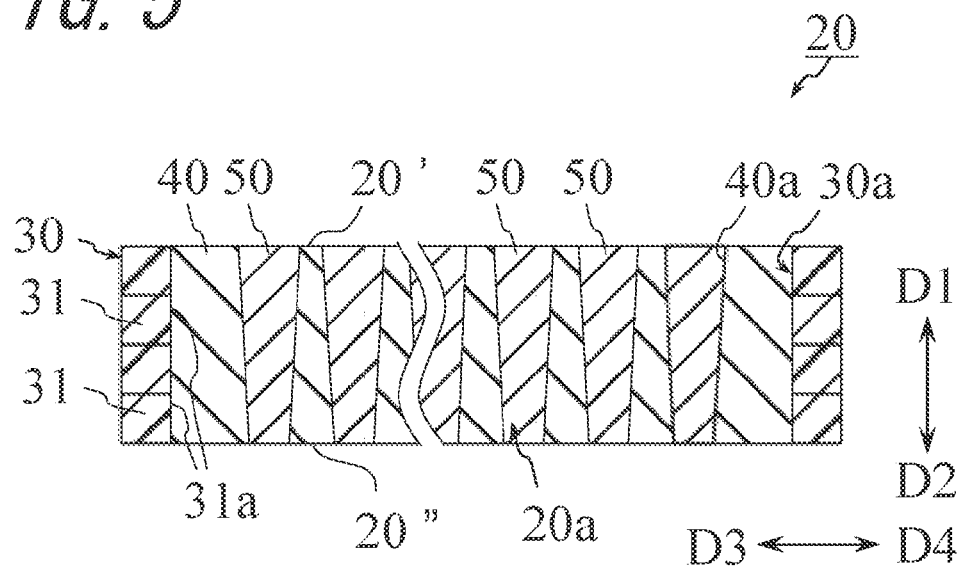
FIG. 5 is a sectional view of a modified example of the first embodiment of the optical transmission structure shown in FIG. 3, illustrating the section taken along the line III-III of FIG. 2.

As shown in FIG. 5, the optical waveguide hole 20a may be so shaped that the cross-sectional area of its section perpendicular to the thickness direction (the D1-D2 direction) becomes smaller gradually from one end (toward the main surface 20' of the optical transmission structure 20) to a point midway between said one end and the other end (toward a second main surface 20" of the optical transmission structure 20). The optical waveguide hole 20a is so shaped that the cross-sectional area becomes smaller gradually from one end to the other end, for example, the percentage of the cross-sectional area drops from 100% to 80%. In this way, by shaping the optical waveguide hole so that the cross-sectional area of its section perpendicular to the thickness direction becomes smaller gradually from one end to a point midway between said one end and the other end, it is possible to fill the core member 50 in the optical waveguide hole 20a while preventing the entry of bubbles such as air bubbles into a region between the inner wall surface of the optical waveguide hole 20a and the core member 50.

Modified Example 3

Figure 6:
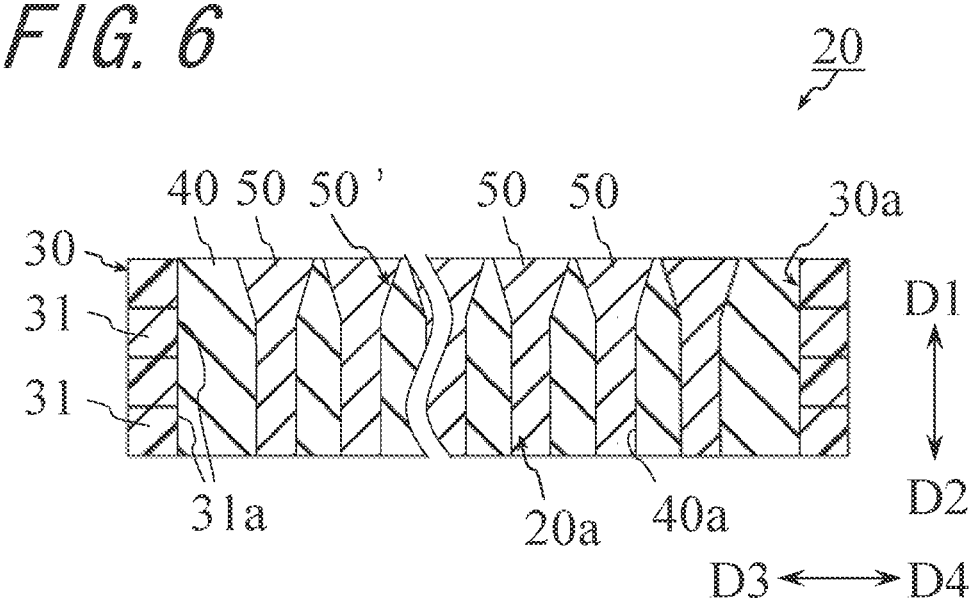
FIG. 6 is a sectional view of a modified example of the first embodiment of the optical transmission structure shown in FIG. 3, illustrating the section taken along the line III-III of FIG. 2.

As shown in FIG. 6, the optical waveguide hole 20a may be formed with a taper portion 50' in which the cross-sectional area of its section perpendicular to the thickness direction (the D1-D2 direction) becomes smaller gradually from one end (toward the main surface 20' of the optical transmission structure 20) to the other end (toward the second main surface 20" of the optical transmission structure 20). With the provision of the taper portion 50' obtained by tapering the optical waveguide hole from one end to a point midway between said one end and the other end, in the optical transmission structure 20 with the optical device mounted thereon, when light enters the core member 50 from said optical device, or when light enters the optical device from the core member 50, it is possible to lessen coupling losses.

Modified Example 4

Figure 7:
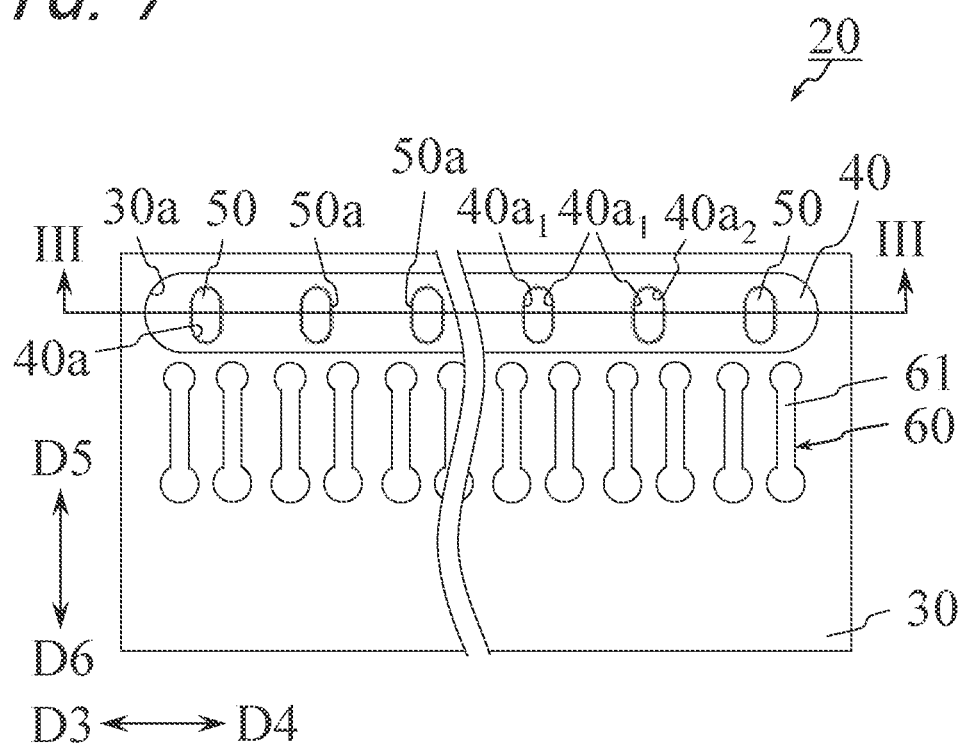
FIG. 7 is a plan view showing a modified example of the first embodiment of the optical transmission structure shown in FIG. 3.

In two adjacent optical waveguide holes 40a, as shown in FIG. 7, each of their confronting side surfaces $40a_1$ may be shaped as a flat surface. Thus, in the optical transmission structure 20, since the side surfaces $40a_1$ of, respectively, the two adjacent optical waveguide holes 40a are each shaped as a flat surface, it is possible to arrange the optical waveguide holes 40a closer to each other. That is, the two adjacent optical waveguide holes 40a can be arranged at as close a spacing as possible.

Moreover, in the two adjacent side surfaces $40a_1$ of the optical waveguide holes 40a arranged in the first direction (the D3-D4 direction), the flat surfaces constituting the confronting side surfaces $40a_1$ of the two optical waveguide holes 40a arranged adjacent each other in the first direction may be increased in size in a second direction (the D5-D6 direction). In this embodiment, the optical waveguide hole 40a is elongated in the second direction intersected by the first direction. By forming the optical waveguide hole 40a so as to extend in the first direction, it is possible to shorten the spaced interval between the optical waveguide holes 40a while maintaining the area of the hole opening wide.

In the optical waveguide hole 40a, its section taken along the planar direction of the main substrate 30 has a non-circular shape, or more specifically nearly the shape of a rounded rectangle. That is, strictly speaking, the "rounded rectangle" is a figure defined by two equal-length parallel lines and two semicircles, but, in this embodiment, the sectional profile is not limited to such a precise rounded rectangle. The optical waveguide hole 40a constitutes a through hole defined by two side surfaces $40a_1$ connected to each other by two curved surfaces $40a2$.

As another shape of the section of the optical waveguide hole 40a taken along the planar direction, for example, as shown in FIG. 8, polygonal shapes including a rectangular shape, a hexagonal shape, and an octagonal shape can be employed. In FIG. 8, FIG. 8(a) shows a rectangular-shaped optical waveguide hole 40j, FIG. 8(b) shows a hexagonal-shaped optical waveguide hole 40k, and FIG. 8(c) shows a trapezoidal-shaped optical waveguide hole 40l. Moreover, the side surface of each optical waveguide hole is designated by the corresponding reference symbol with a numerical subscript of 1.

In the interior of each second through hole 40a is disposed the core member 50. The core member 50 is so shaped as to conform to the shape of the optical waveguide hole 40a. That is, a plurality of core members 50 are arranged along the first direction, and each of them is so formed as to extend in the thickness direction. For example, the spacing between the core members 50 in the first direction may fall in the range of 62.5 μm or more and 250 μm or less.

Moreover, for example, the diameter of the core member 50 along the first direction may fall in the range of 10 μm or more and 100 μm or less. Further, in two adjacent ones of the plurality of core members 50, their confronting side surfaces 50a extend along the second direction. In the core member 50, its section taken along the planar direction of the main substrate 30 has a non-circular shape, or more specifically nearly the shape of a rounded rectangle. Further, in FIG. 8 as mentioned above, FIG. 8(a) shows a rectangular-shaped core member 50j, FIG. 8(b) shows a hexagonal-shaped core member 50k, and FIG. 8(c) shows a trapezoidal-shaped core member 50l. In addition, the side surface of each core member is designated by the corresponding reference symbol with a numerical subscript of 1.

Thus, the optical waveguide hole 40a can be given a desired shape, and this is an advantage which accrues from the use of photolithography for the boring of the optical waveguide hole 40a. According to the conventional art, in the course of forming an optical waveguide hole, since an optical through hole is created by means of drilling, it is difficult to shape the hole into a figure other than a true circle, wherefore the shape of the through hole is practically limited to a true circle. Even if the hole can be shaped into a figure other than a true circle, much time needs to be spent in the shaping operation, which leads to poor shaping reproducibility.

Besides, in order to obtain a shape other than the shape of a true circle by the conventional art, there arises a need for a cutting edge of a size smaller than the diameter of an optical waveguide hole to be formed. As has already been described by way of example, the diameter of the optical waveguide hole 40a may fall in the range of 10 μm or more and 100 μm or less, and it will thus be difficult to prepare a cutting edge of a size smaller than the diameter in this range. Even if a cutting edge of such a diameter can be prepared, the cutting edge is so brittle that it is hard to perform cutting work.

On the other hand, in the case of forming the optical waveguide hole 40a by means of photolithography, a shape other than the shape of a true circle can be obtained with ease by causing a to-be-exposed area to vary according to the shape of a mask, and also a higher degree of reproducibility can be attained.

(Method for Manufacturing Optical Transmission Structure in Accordance with First Embodiment)

Hereinafter, a method for manufacturing the optical transmission structure 20 that exemplifies the method of manufacturing the first optical transmission structure pursuant to the invention will be described with reference to the drawings.

To begin with, there is prepared a main substrate 30 having a through hole 30a penetrating therethrough in the thickness direction (the D1-D2 direction). The main substrate 30 of this embodiment is produced by performing the following steps. At first, as shown in FIG. 9(a), a plurality of green sheets 31X that are formed into secondary substrates 31 by firing process are prepared. Next, as shown in FIG. 9(b), a sheet hole 31Xa is formed in the green sheet 31X to provide a secondary through hole 31a. Concurrently with the formation of the sheet hole 31Xa, a through hole used for a through conductor of an electric wiring 60 is formed on an as needed basis. Such holes can be made by various methods, for example, by punching out the sheet with a pin or die or by cutting the sheet with laser light. Next, a metal paste for forming the electric wiring 60 is placed on the green sheet 31X.

The metal paste can be prepared by utilizing screen printing technique or ink-jet printing technique, for example. As the metal paste for forming the electric wiring 60, for example, a paste containing metal such as tungsten (W), molybdenum (Mo), manganese (Mn), silver (Ag), and copper (Cu) can be used. Then, as shown in FIG. 9(c), the green sheets 31X are stacked on top of each other so that the sheet holes 31Xa can be continuous with each other. Next, the stacked green sheets 31X are fired, thereby constituting the main substrate 30 formed with the through hole 30a as shown in FIG. 9(d). Concurrently with the firing of the green sheets 31X, the metal paste is fired to constitute the electric wiring 60.

Figure 10:
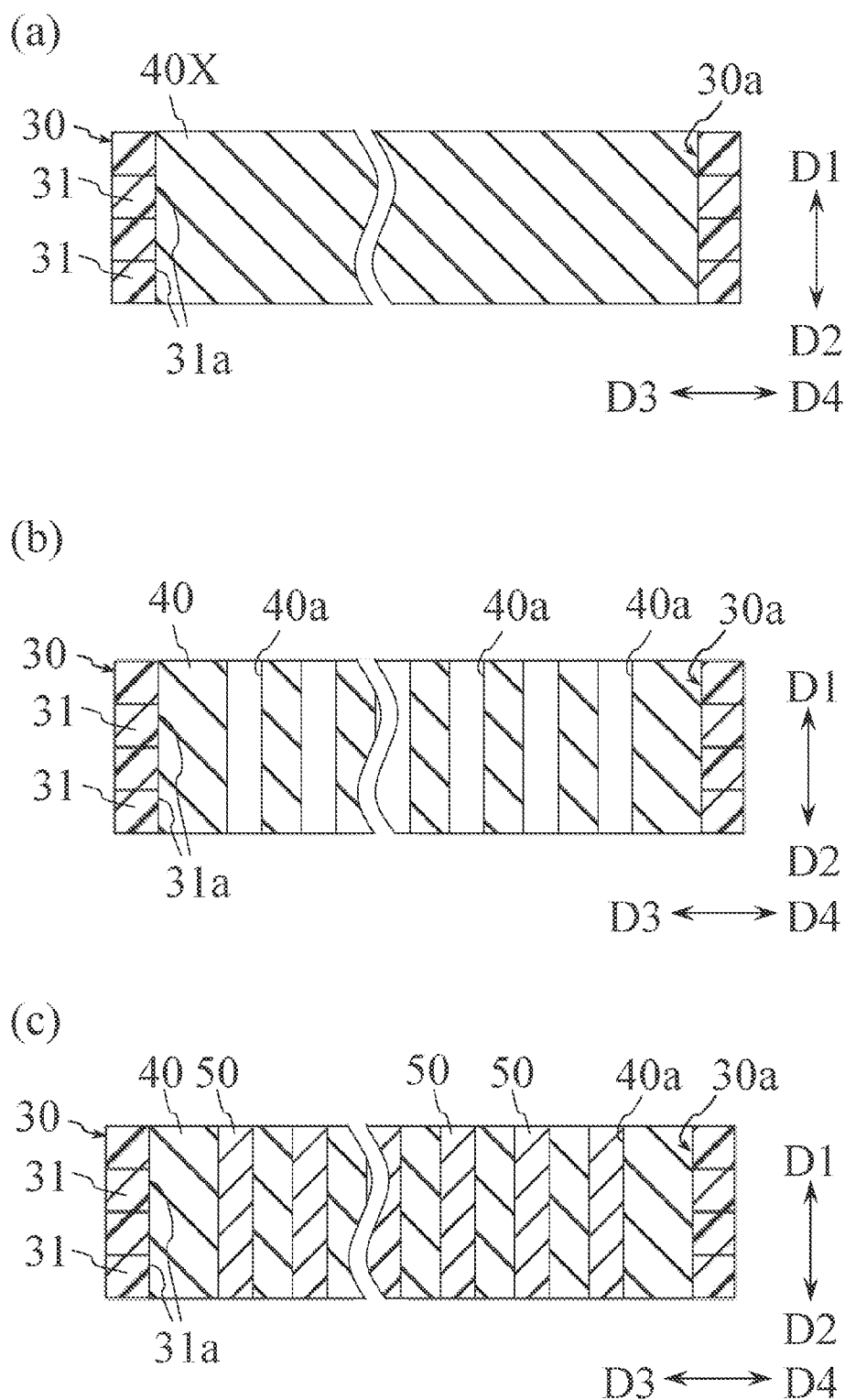
FIG. 10 is a main-part sectional view showing the subsequent steps of the procedure for manufacturing the optical transmission structure shown in FIG. 9.

Next, as shown in FIG. 10(a), the through hole 30a of the main substrate 30 is filled with a photosensitive material 40X that can be formed into a cladding member 40 by curing process. Examples of the photosensitive material include an epoxy resin-based material, an acrylic resin-based material, and a polyimide resin-based material. In this embodiment, there is adopted a negative photoresist whose solubility in a developer solution is decreased through exposure to light.

Then, following the heating (pre-baking) of the photosensitive material 40X, the pre-baked photosensitive material 40X is exposed to light. The exposure process is performed with use of a light-transmitting plate such as a photomask having a plurality of light-shielding portions for blocking light to avoid application of light to a region for forming an optical waveguide hole 40a. By means of such a photomask, in the pre-baked photosensitive material 40X, its region other than the region in overlapping relation with the above-described light-shielding portion is exposed to light.

In the exposure process, for example, lamps of various types, laser light, and electron beams can be adopted as a light source. Next, the exposed photosensitive material 40X is heated (post-baked). Then, the post-baked photosensitive material 40X is developed by a developer solution so that the exposed part of the photosensitive material 40X can be turned into the cladding member 40, whereupon, as shown in FIG. 10(b), the cladding member 40 having the optical waveguide hole 40a is formed.

After that, in the photosensitive material 40X, its part other than the part which has been turned into the cladding member 40, that is, unexposed part of the photosensitive material 40X is removed, so that a plurality of optical waveguide holes 40a penetrating in the thickness direction can be formed in the cladding member 40.

Next, a light-transmitting material for forming a core member 50 is filled into the optical waveguide hole 40a of the cladding member 40. After that, the filled light-transmitting material is cured by means of application of light having a predetermined wavelength, baking, or otherwise, thereby forming the core member 50 as shown in FIG. 10(c).

Upon completion of the procedure thus far described, the optical transmission structure 20 shown in FIG. 10(c) is produced.

(Modified Example 1 of Method for Manufacturing Optical Transmission Structure in Accordance with First Embodiment)

Following the step of charging the light-transmitting material for forming the core member 50 in the optical waveguide hole 40a, it is advisable to polish the main surface 20' of the optical transmission structure 20 for planarization. Although there may be a case where, after the core member 50 is formed in the optical waveguide hole 40a, the light-transmitting material for forming the core member extends off the main surface 20' of the optical transmission structure 20, by planarizing the main surface 20' of the optical transmission structure 20, it is possible to facilitate mounting of an optical device and so forth thereon. For example, chemical mechanical polishing technique can be adopted as the method of polishing the main surface 20' of the optical transmission structure 20.

<Second Embodiment of Optical Transmission Structure and Optical Transmission Module>

Hereinafter, an optical transmission module 10A which exemplifies the optical transmission module of the invention by way of a second embodiment will be described with reference to the drawings.

Figure 11:
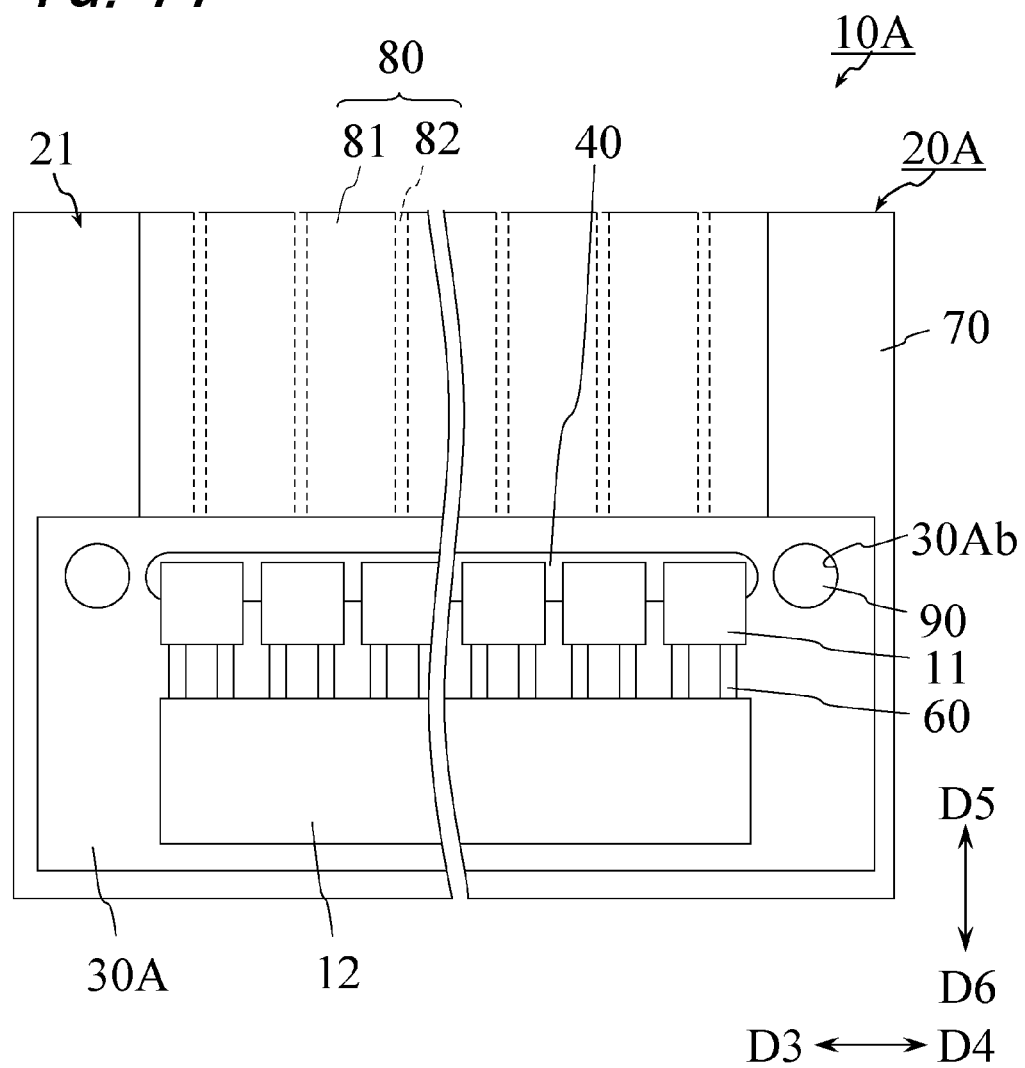
FIG. 11 is a plan view showing the general constitution of a second embodiment of an optical transmission module pursuant to the invention.

The optical transmission module 10A shown in FIG. 11 includes an optical transmission structure 20A, an optoelectronic conversion device 11 used as an optical device, and a circuit component 12. The optoelectronic conversion device 11, as well as the circuit component 12, is structurally similar to that as particularized hereinabove, and the description thereof will therefore be omitted.

Figure 12:
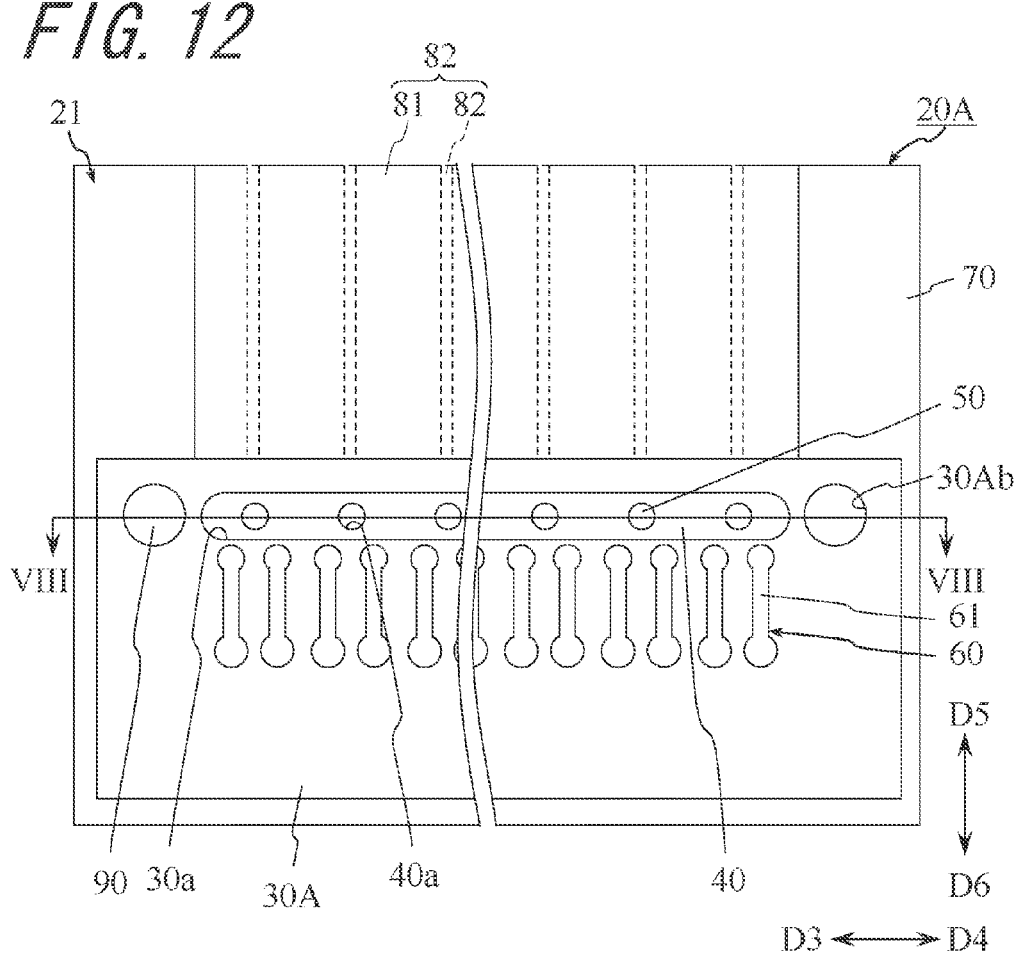
FIG. 12 is a plan view, with parts omitted, of the optical transmission module shown in FIG. 11.

The optical transmission structure 20A shown in FIGS. 11 and 12 differs structurally from the optical transmission structure 20 in that a main substrate 30A is adopted instead of the main substrate 30 and that an optical wiring substrate 21 is provided. Other portions of the optical transmission structure 20A are structurally identical to those of the optical transmission structure 20, and overlapping descriptions will thus be omitted. The main substrate 30A differs structurally from the main substrate 30 in that a bearing hole 30Ab is formed. Other portions of the optical transmission structure 20A are structurally identical to those of the optical transmission structure 20, and overlapping descriptions will thus be omitted.

The bearing hole 30Ab serves as the reference for optical alignment of the optical waveguide 20a. The bearing hole 30Ab is formed by recessing the main substrate 30A in a direction from, of both main surfaces thereof, one main surface 20' on the D1 direction side toward the D2 direction. That is, the bearing hole 30Ab is opened at the main surface 20" opposite from the main surface which bears the optoelectronic conversion device 11. The bearing hole 30Ab of this embodiment passes completely through the substrate in the thickness direction thereof. Note that the bearing hole 30Ab is not limited to a hole penetrating in the thickness direction (the D1-D2 direction).

There are provided two bearing holes 30Ab. The core member 50 is placed between these bearing holes 30Ab. In this embodiment, the two bearing holes 30Ab and an array of a plurality of core members 50 are arranged along the first direction (the D3-D4 direction). The centers of the bearing holes 30Ab and the centers of the core members 50 are arranged along the first direction.

The proper arrangement of the bearing holes 30Ab and the core members 50 can be made with ease by using the bearing holes 30Ab as the reference in the process of exposing the region for forming the optical waveguide hole 40a to light. In this way, by arranging the bearing holes 30Ab and the core members 50 in one direction and also locating the bearing hole 30Ab at each end of the array of the core members 50, it is possible to control surface inclination with respect to other optical wiring components as will hereafter be described (for example, an optical transmission layer 80, an optical path changing portion 82b).

Figure 13:
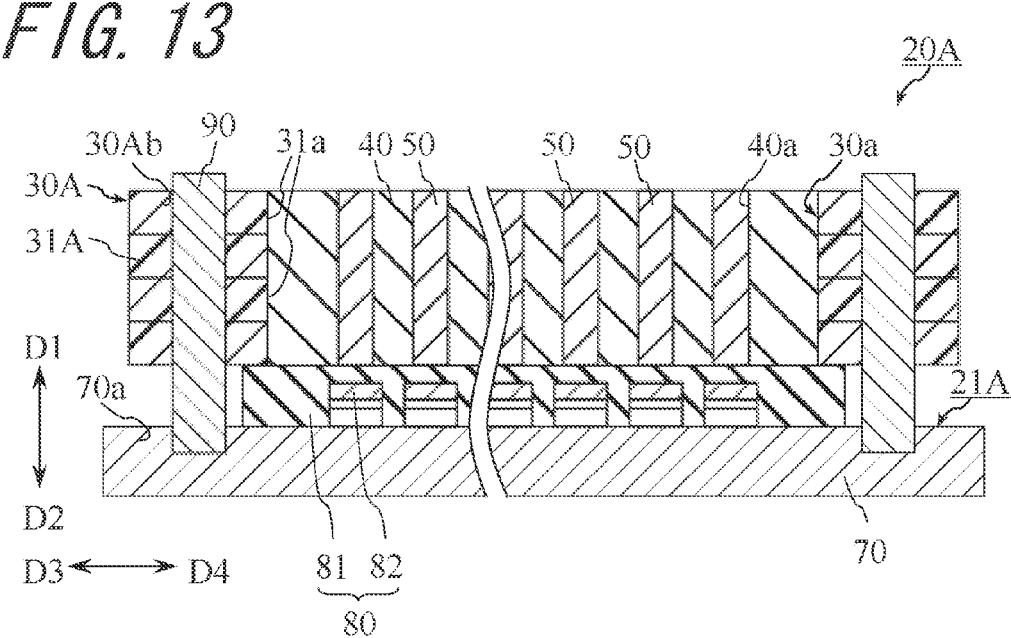
FIG. 13 is a main-part sectional view taken along the line VIII-VIII shown in FIG. 12.

As shown in FIG. 13, the optical wiring substrate 21 includes a support substrate 70, the optical transmission layer 80, and an optical axis member 90. While the optical wiring substrate 21 of this embodiment includes the optical axis member 90, the optical axis member 90 does not necessarily have to be provided.

The support substrate 70 acts to support other constituents of the optical wiring substrate 21. Moreover, the support substrate 70 may have the function of providing electrical connection between the optical transmission structure 20A and other electric elements. As the support substrate 70 which serves such an electrical connection, a build-up substrate which is composed of a base body and a build-up layer and has a through conductor, is preferably used. The build-up layer is composed of a resin insulating layer and an electrically conductive layer. For example, thermosetting epoxy resin, bismaleimide triazine resin, or the like is used for the resin insulating layer.

For example, the thickness of the resin insulating layer may fall in the range of, for example, 10 μm or more and 70 μm or less. It is preferable that the resin insulating layer is capable of being subjected to laser micromachining for pore formation. By virtue of the resin insulating layer, it is possible to stack the build-up layers together while effecting routing of complicated electric wiring patterns and integration in a narrow range.

The support substrate 70 has a bearing hole 70a formed by recessing the support substrate in the direction from one main surface on the D1 direction side toward the D2 direction. The bearing hole 70a is situated so as to pair up with the bearing hole 30Ab of the main substrate 30. The bearing hole 70a serves as the reference for optical alignment between the optical transmission layer 80 and the core member 50.

The optical transmission layer 80 includes an optical transmission cladding member 81 and an optical transmission core member 82. The optical transmission cladding member 81 functions as the base body of the optical transmission layer 80. The optical transmission core member 82 is formed inside the optical transmission cladding member 81. A refractive index of the optical transmission core member 82 is greater than a refractive index of the optical transmission cladding member 81. So long as the refractive index of the optical transmission core member 82 is greater than that of the optical transmission cladding member 81, the optical transmission layer 80 is capable of confinement of optical signals and is thus able to serve as an optical waveguide. The optical transmission core member 82 of this embodiment is so designed that a part thereof functions as an optical waveguide 82a. The refractive index of the optical transmission core member 82 is preferably so determined that the relative refractive index difference between the optical transmission core member 82 and the optical transmission cladding member 81 falls in the range of 0.8% or more and 4% or less.

A plurality of optical transmission core members 82 are formed inside the optical transmission cladding member 81, and each of them extends along a certain extending direction. Herein, the extending direction is defined as "the D5-D6 direction". The plurality of optical transmission core members 82 are arranged along the above-described first direction. In the optical wiring substrate 21, the extending direction in which the optical transmission core member 82 extends is equivalent to the direction of optical transmission. Where the dimension of the optical transmission core member 82 is concerned, in the direction of the plane along the first direction and the thickness direction, or the planar direction D1, D2-D3, D4, the length of one side or the diameter of the optical transmission core member 82 may advisably fall in the range of 10 μm or more and 100 μm or less.

Figure 14:
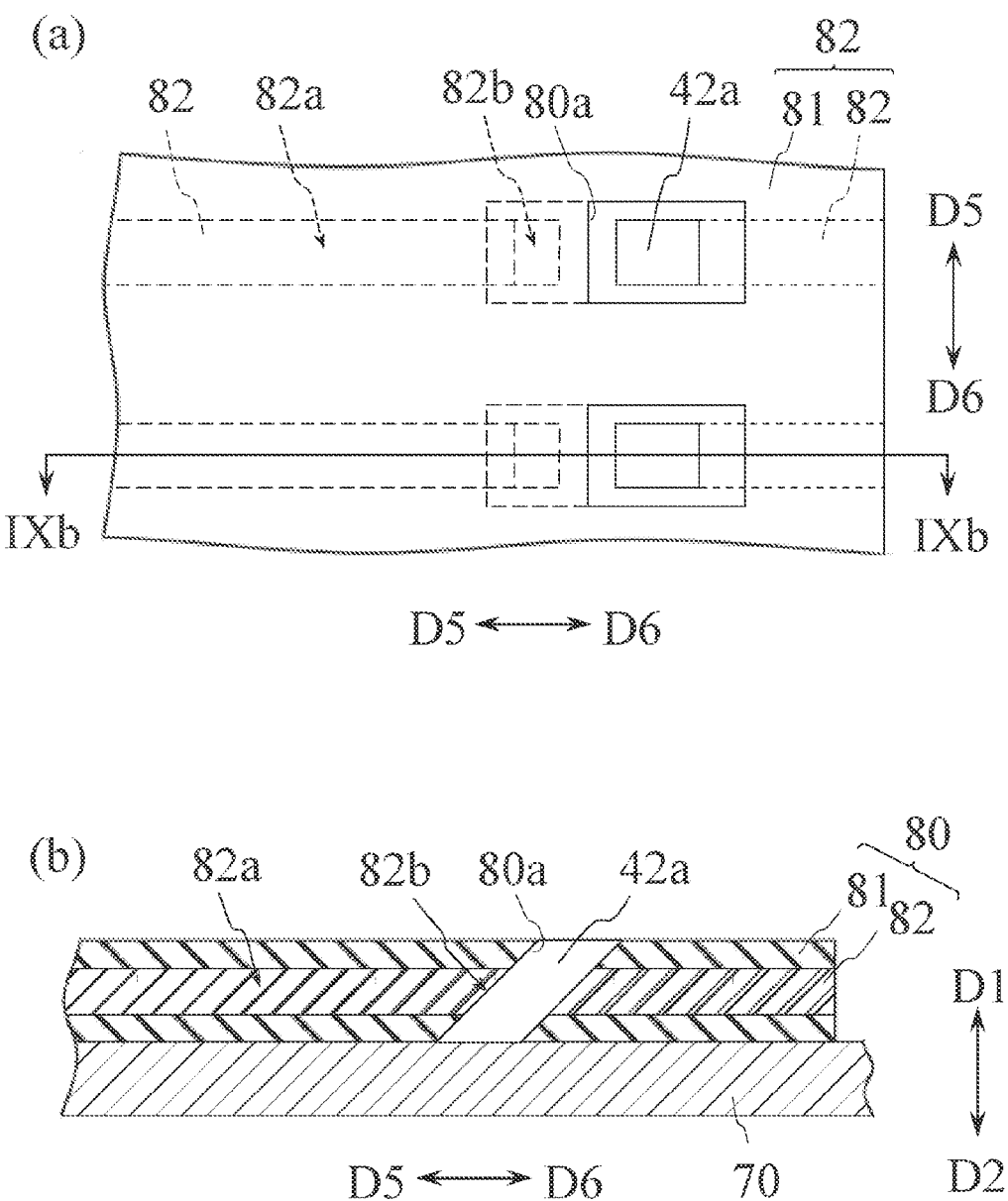
FIG. 14(*a*) is an enlarged plan view of the main part of an optical wiring substrate provided in the optical transmission module shown in FIG. 11, and FIG. 14(*b*) is a main-part sectional view taken along the line IXb-IXb shown in FIG. 14(*a*)

As shown in FIG. 14, the optical transmission core member 82 is formed with the optical path changing portion 82b. The optical path changing portion 82b is formed at an end of the optical waveguide 82a as shown in FIG. 14(a). The optical path changing portion 82b has the capability of enabling a change in an optical path so that light propagating through the optical waveguide 82a can be directed to outside of the optical waveguide 82a, or the capability of enabling a change in an optical path so that incoming light from outside of the optical waveguide 82a can be directed to the interior of the optical waveguide 82a. That is, in the optical transmission core member 82, that part thereof which is located on the D5 direction side relative to the optical path changing portion 82b in the extending direction serves as the optical waveguide 82a, whereas that part thereof which is located on the D6 direction side relative to the optical path changing portion 82b in the extending direction does not serve as the optical waveguide 82a.

In this embodiment, a light-reflecting face is formed as the optical path changing portion 82b. The light-reflecting face is inclined with respect to the optical axis of the optical waveguide 82a, and enables a change in an optical path by reflection of light. As the angle of inclination of the light-reflecting face, it is possible to use an angle obtained by bisecting the angle which the direction of the optical axis of the optical waveguide 82a forms with the direction of a redefined optical path, and, for example, the light-reflecting face is formed at an inclination angle which falls in the range of the bisected angle ±3 degrees.

As shown in FIG. 14(b), the optical transmission layer 80 of this embodiment has a cavity 42a formed by recessing the top surface thereof. In the cavity 42a, the optical transmission cladding member 81 and the optical transmission core member 82 are left exposed at the inner periphery thereof. In this embodiment, a single optical transmission core member 82 is divided into two segments by the cavity 42a. In this embodiment, part of the optical transmission core member 82 left exposed at the inner surface of the cavity 42a serves as a light-reflecting face. In this embodiment, this light-reflecting face constitutes the optical path changing portion 82b. The upper surface of the optical path changing portion 82b may be covered with a reflective film such as a metal film.

The cavity 42a serves as an entrance opening for admitting light into the optical waveguide 82a via the light-reflecting face, or an exit opening for taking out light propagating through the optical waveguide 82a via the light-reflecting face. The light-reflecting face is inclined at an angle of about 45°, or more specifically an angle in the range of 42 to 48°, with respect to the extending direction and the thickness direction. Note that the cavity 42a may either be shaped as a hollow or be filled with some material in so far as it is able to serve as the entrance or exit opening.

Exemplary of the material of formation of the optical transmission cladding member 81 and the optical transmission core member 82 is a resin capable of being subjected to direct exposure process or a resin capable of being subjected to refractive-index variation process. Examples of the resin capable of being subjected to direct exposure process include a photosensitive resin such as epoxy resin, acrylic resin, and polyimide resin. Moreover, examples of the resin capable of being subjected to refractive-index variation process include a resin whose refractive index is decreased by Ultra-Violet (UV) radiation, such as polysilane.

It is noted that the direct exposure process is a method for forming the optical transmission layer 80 by forming the lower part of the optical transmission cladding member 81, followed by forming the optical transmission core member 82 thereon by coating the material of formation of the optical transmission core member 82 and exposing it to light with masks, and further coating the material of formation of the optical transmission cladding member 81 on the top and side surfaces of the optical transmission core member 82. Moreover, the refractive-index variation process is a method for forming the optical waveguide by performing UV radiation on a region other than the region for forming the optical transmission core member 82 to reduce the refractive index of the region other than the region for forming the optical transmission core member 82.

The optical axis member 90 is an axis member which serves as the reference for optical alignment of the optical waveguide 20a and the optical waveguide 82a. The optical axis member 90 is inserted in the bearing hole 30Ab as well as in the bearing hole 70a. For example, a member in the form of a straight rod can be used for the optical axis member 90.

(Modified Example 1 of Optical Transmission Structure and Optical Transmission Module in Accordance with Second Embodiment)

The shape of the core member 50 of the modified example 4 of the first embodiment of the optical transmission structure as described above may be applied to the optical transmission structure 20A and the optical transmission module 10A of this embodiment.

In the optical transmission structure 20A and the optical transmission module 10A, where the optical transmission core member 82 of the optical transmission layer 80 has a polygonal sectional profile, the core member 50 of the optical transmission structure 20A may be given a polygonal sectional profile. In the case of configuring the optical transmission core member 82 of the optical transmission layer 80 and the core member 50 so that they have the same polygonal sectional profile, since the optical transmission core member and the core member are identical in shape, it is possible to suppress an optical loss that occurs when light which exited from the core member 50 enters the optical transmission layer 80.

Moreover, as shown in FIGS. 7 and 8, where the core member 50 is so shaped that, when viewed in a plan view, as compared to its transverse width parallel to the first direction (the D3-D4 direction), its longitudinal width parallel to the second direction (the D5-D6 direction) intersected by the first direction is larger, it is possible to dispose the optical transmission layer 80 in a direction parallel to the second direction. By disposing the optical transmission layer 80 as such, an optical signal can be transmitted through the optical waveguide 80a and reflected from the optical path changing portion 82b while being restrained from light diffusion in a direction intersected by the transmission direction. Thus, in the construction of this embodiment, it is possible to increase virtually the area of the opening for the optical waveguide 80a while reducing the spacing between the optical waveguide holes 40a. Accordingly, the construction of this embodiment is capable of both miniaturization and suppression of losses entailed by optical coupling between the optical waveguide 20a and the optical waveguide 80a.

<Third Embodiment of Optical Transmission Structure>

Hereinafter, an optical transmission structure 20B which exemplifies the optical transmission structure of the invention by way of a third embodiment will be described with reference to the drawings.

Figure 15:
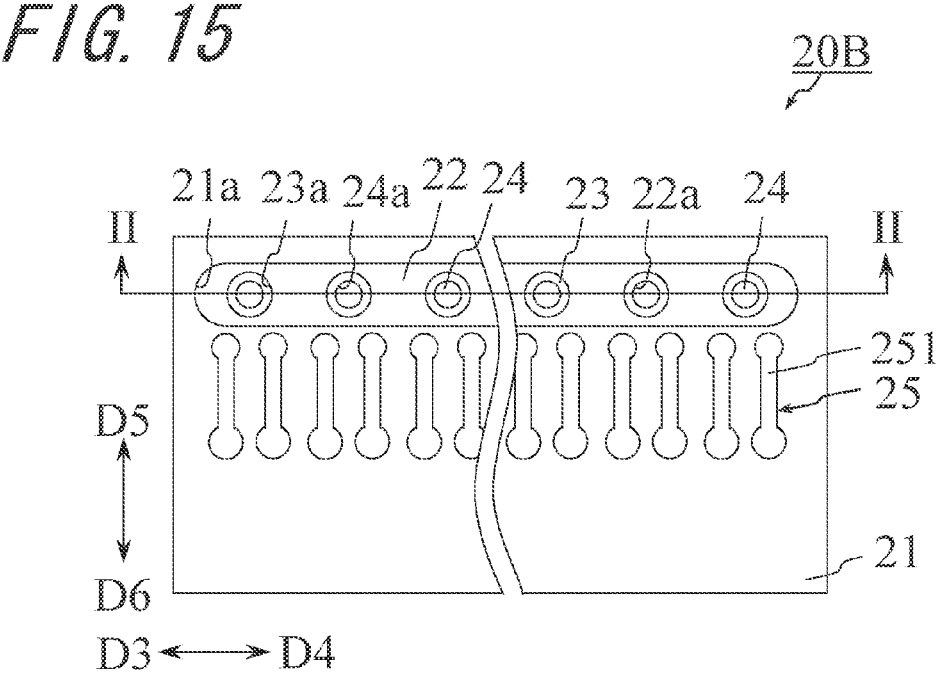
FIG. 15 is a plan view showing the general constitution of a third embodiment of an optical transmission structure pursuant to the invention.
Figure 16:
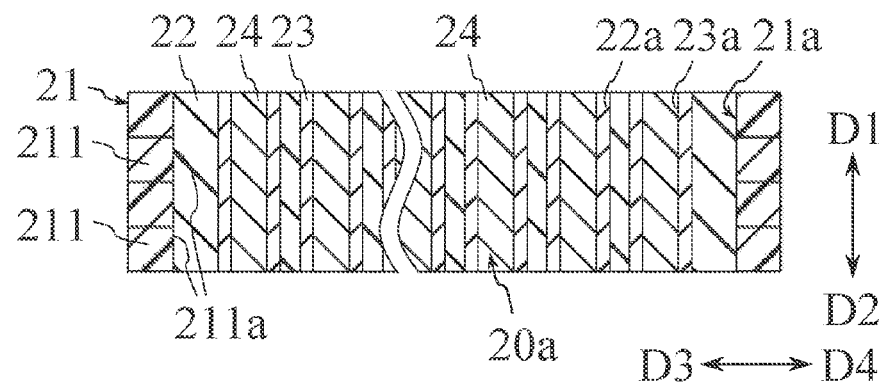
FIG. 16 is a sectional view taken along the line II-II shown in FIG. 15.

In the optical transmission structure 20B shown in FIGS. 15 and 16, a second cladding member 23 is disposed between a cladding member 22 and a core member 24. More specifically, the second cladding member 23 is situated between the cladding member 22 and the core member 24 so as to surround the core member 24. Moreover, a refractive index of the second cladding member 23 is smaller than a refractive index of the core member 24.

In the optical transmission board 20B, with the provision of the second cladding member 23, the diameter of the core member 24 can be reduced. As employed herein, the term "diameter" refers to the diameter of the section taken along the planar direction. The reduction of the diameter of the core member 24 affords the following advantages. In the case of mounting a light-emitting device as an optoelectronic conversion device 30 on the optical transmission board 20B, when the optical waveguide 20a is optically coupled to other different optical waveguide, it is possible to lessen losses entailed by a misalignment in optical axis between these optical waveguides.

In the case of mounting a light-receiving device as the optoelectronic conversion device 30 on the optical transmission board 20B, a light-receiving device having a small light-receiving section can be adopted. In particular, a photodiode has a negative correlation between the size of a light-receiving section and the speed of response, and in fact, the smaller the light-receiving section is, the faster the response is. That is, in the case of mounting a light-receiving device on the optical transmission board 20B, speeding-up of the response can be achieved.

In the optical transmission board 20B of this embodiment, a material which is smaller in refractive index than the cladding member 22 can be used for the second cladding member 23. By the use of a material having a relatively small refractive index for the second cladding member 23, the relative refractive index difference between the second cladding member and the core member 24 which serves as the optical waveguide 20a can be increased with ease. That is, the use of a material having a relatively small refractive index for the second cladding member 23 makes it possible to extend the range of material choices for the core member 24.

(Method for Manufacturing Optical Transmission Structure in Accordance with Third Embodiment)

Hereinafter, a method for manufacturing the optical transmission structure 2B that exemplifies the method of manufacturing the optical transmission structure in accordance with the third embodiment will be described with reference to the drawings. Note that a substrate as shown in FIG. 17(*a*), which is composed of a stack of a plurality of secondary substrates 211 and a cladding member 22 with an optical waveguide hole 22a set in a through hole 21a, is prepared by using the method for manufacturing the optical transmission structure in accordance with the first embodiment as described above.

Next, as shown in FIG. 17(b), a precursor of a resin material in liquid form for forming the second cladding member 23 is applied to the inner wall of the optical waveguide hole 22a of the cladding member 22. It is advisable to exploit negative pressure for the application of the resin material precursor. Specifically, at first, pressure adjustment is made so that, as compared to the atmospheric pressure at one side of the opening of a first optical waveguide hole 22a, the atmospheric pressure at the other side becomes lower. Next, the resin material precursor in liquid form is poured from said one side. The resin material precursor is drawn into the opening under the difference in atmospheric pressure so as to be applied to the inner wall of the first optical waveguide hole 22a, and a through hole for the passage of air is formed in the middle. This through hole serves as the first optical waveguide hole 22a. Lastly, the resin material precursor is cured, thereby forming the second cladding member 23.

Next, a light-transmitting material for forming the core member 24 is filled into a second optical waveguide hole 23a of the second cladding member 23. Subsequently the light-transmitting material is cured, thereby forming the core member 24 as shown in FIG. 17(c). Upon completion of the procedure thus far described, the optical transmission board 20B shown in FIGS. 15 and 16 is produced.

<Fourth Embodiment of Optical Transmission Structure>

Hereinafter, an optical transmission structure 20C which exemplifies the optical transmission structure of the invention by way of a fourth embodiment will be described with reference to the drawings.

Figure 18:
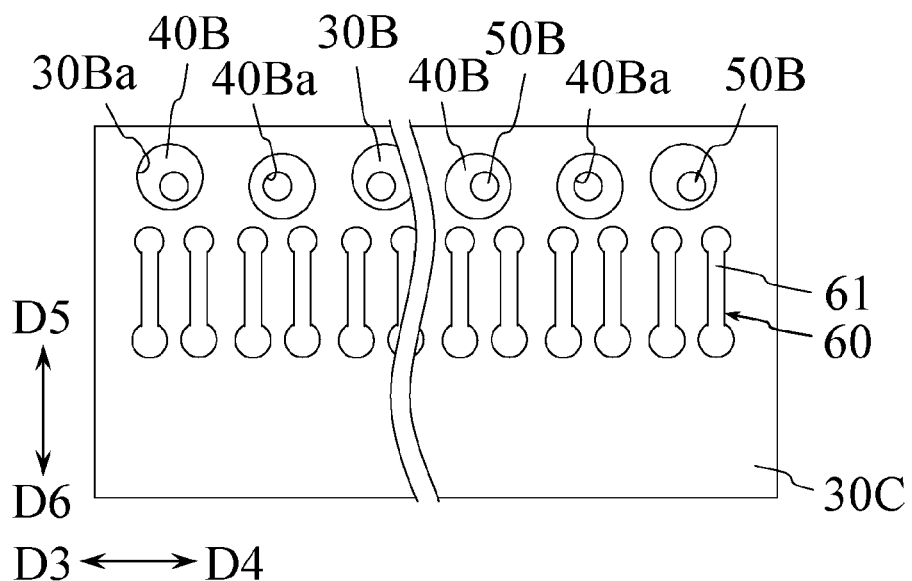
FIG. 18 is a plan view showing the general constitution of a fourth embodiment of an optical transmission structure pursuant to the invention.

The optical transmission structure 20C shown in FIG. 18 differs structurally from the optical transmission structure 20 in that a main substrate 30C is adopted instead of the main substrate 30 and that a cladding member 40B is adopted instead of the cladding member 40. Other portions of the optical transmission structure 20C are structurally identical to those of the optical transmission structure 20, and overlapping descriptions will thus be omitted.

Specifically, the optical transmission structure 20C includes a substrate 30B having a plurality of through holes 30Ba penetrating therethrough in a thickness direction (the D1-D2 direction) thereof; a cladding member 40B having an optical waveguide hole 40Ba penetrating therethrough in a thickness direction thereof and disposed in at least one of the plurality of through holes 30Ba; and a plurality of core members 50B disposed inside the optical waveguide hole 40B, respectively, which are greater in refractive index than the cladding member 40B.

The main substrate 30C has a plurality of through holes 30Ba. The plurality of through holes 30Ba are arranged in the first direction (the D3-D4 direction). Each of the plurality of through holes 30Ba is provided with the cladding member 40B. The cladding member 40B is provided with at least one optical waveguide hole 40Ba. The optical waveguide holes 40Ba are arranged along the first direction. Each of the plurality of optical waveguide holes 40Ba is provided with a single core member 50B.

In the optical transmission structure 20B of this embodiment, where the plurality of through holes 30Ba are provided, the through holes 30Ba do not necessarily have to be arranged in a row along the first direction, and also the plurality of through holes 30Ba do not necessarily have to be equi-spaced in the first direction. In this regard, in the optical transmission structure 20B of this embodiment, in contrast to the plurality of through holes 30Ba, the optical waveguide holes 40Ba are arranged linearly along the first direction, and are also nearly equi-spaced.

Other portions of the optical transmission structure 20B of this embodiment are structurally identical to those of the optical transmission structure 20, and overlapping descriptions will thus be omitted. Note that, although the optical transmission structure 20B of this embodiment does not employ the bearing hole 30Ab and the optical wiring substrate 21 adopted in the optical transmission structure 20A, these components may be adopted in this embodiment.

The production of such an optical transmission structure 20C can be based mainly on the method for manufacturing the optical transmission structure 20 in accordance with the first embodiment described above. Differences from the method for manufacturing the optical transmission structure 20 include forming the plurality of through holes 30Ba in the substrate 30B and providing the optical waveguide hole 40Ba in the through hole 30Ba. In this way, since the cladding member 40B bearing the optical waveguide hole 40B is formed by means of photolithography, it is possible to impart smoothness to the inner wall of the optical waveguide hole 40B, and thereby lessen losses of light propagating through the core member 50B disposed in the interior of the optical waveguide hole 40a. Also in the case of forming the optical waveguide hole 40Ba in the cladding member 40B placed inside the through hole 30B, the formation can be accomplished with ease by virtue of simultaneous exposure process.

<Fifth Embodiment of Optical Transmission Structure>

Hereinafter, an optical transmission structure 20D which exemplifies the optical transmission structure of the invention by way of a fifth embodiment will be described with reference to the drawings.

Figure 19:
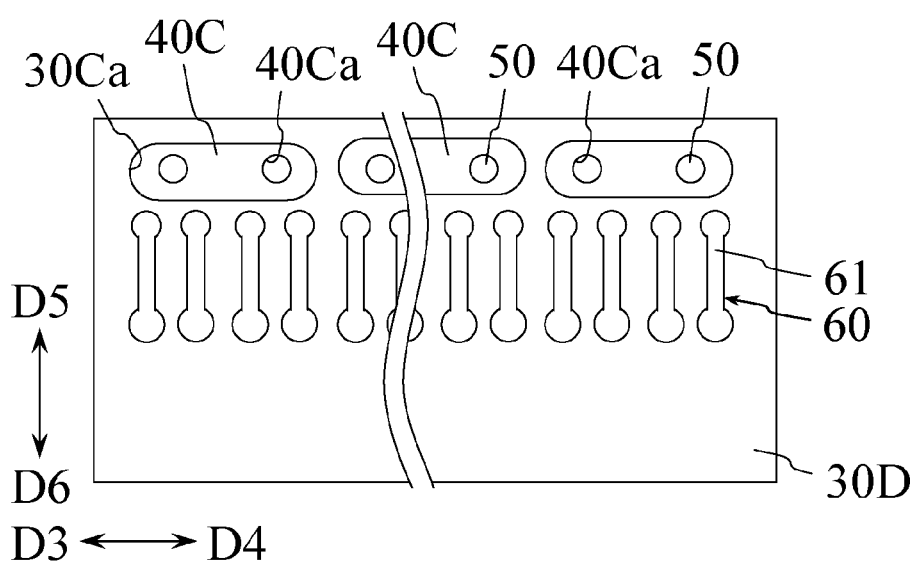
FIG. 19 is a plan view showing the general constitution of a fifth embodiment of the optical transmission structure pursuant to the invention.

The optical transmission structure 20D shown in FIG. 19 differs structurally from the optical transmission structure 20 in that a main substrate 30D is adopted instead of the main substrate 30 and that a cladding member 40D is adopted instead of the cladding member 40. Other portions of the optical transmission structure 20C are structurally identical to those of the optical transmission structure 20, and overlapping descriptions will thus be omitted.

The main substrate 30D has a plurality of through holes 30Ca. The plurality of through holes 30Ca are arranged in the first direction (the D3-D4 direction). Each of the plurality of through holes 30Ca is provided with the cladding member 40C. Each of the cladding member 40C is provided with a plurality of optical waveguide holes 40Ca. While, in the optical transmission structure 20C shown in FIG. 19, two optical waveguide holes 40Ca are provided in a single cladding member 40C, the number of the optical waveguide holes is not so limited, and therefore three or more optical waveguide holes may be provided. The plurality of optical waveguide holes 40Ca are arranged along the first direction. Each of the plurality of optical waveguide holes 40Ca is provided with a single core member 50C.

In the optical transmission structure 20C of this embodiment, the plurality of through holes 30Ca do not necessarily have to be arranged in a row along the first direction, and also the plurality of through holes 30Ca do not necessarily have to be equi-spaced in the first direction. In this regard, in the optical transmission structure 20C of this embodiment, in contrast to the plurality of through holes 30Ca, the optical waveguide holes 40Ca are arranged linearly along the first direction, and are also nearly equi-spaced.

Other portions of the optical transmission structure 20C of this embodiment are structurally identical to those of the optical transmission structure 20, and overlapping descriptions will thus be omitted. Note that, although the optical transmission structure 20C of this embodiment does not employ the bearing hole 30Ab and the optical wiring substrate 21 adopted in the optical transmission structure 20A, these components may be adopted in this embodiment.

The production of such an optical transmission structure 20D can be based mainly on the method for manufacturing the optical transmission structure 20 in accordance with the first embodiment described above. Differences from the method for manufacturing the optical transmission structure 20 include forming the plurality of through holes 30Ba in the substrate 30B and providing the plurality of optical waveguide holes 40Ba in the through hole 30Ba. In this way, since the cladding member 40B bearing the plurality of optical waveguide holes 40B is formed by means of photolithography, it is possible to form the cladding members 40B each bearing the plurality of optical waveguide holes 40B at the same time, and also, in contrast to the case of forming the optical waveguide holes by conventional cutting technique, it is possible to shorten the time required for the process to form the optical waveguide holes 40B, as well as to facilitate control of the positions of the optical waveguide holes 40B and control of the shape of the inner wall thereof.

It should be understood that the application of the invention is not limited to the embodiments as described heretofore, and that many modifications and variations of the invention are possible without departing from the spirit and scope of the invention.

While, in the method for manufacturing the optical transmission structure 20 as described hereinabove, a negative photoresist is adopted, it is possible to adopt instead a positive photoresist whose solubility in a developer solution is increased through exposure to light. In the case of using the positive photoresist, regions to be exposed to light need to be changed correspondingly.

While the method for manufacturing the optical transmission structure 20 as described hereinabove is directed to the adoption of a ceramic substrate for the main substrate 30, it is possible to produce the optical transmission structure with use of an organic substrate. In the case of producing the optical transmission structure with use of an organic substrate, it is advisable that, after the stacking of secondary substrates, the resultant base body is subjected to punching operation to form through holes in the substrates. In the case of punching out the secondary substrates en masse, positional deviation between secondary through holes can be minimized.

While, in the above-described embodiments, the optical wiring substrate 21 including the support substrate 70 is adopted, the optical transmission layer 80 does not necessarily have to be supported. For example, the cladding member 40 and the core member 50 may be optically connected to the optical transmission layer 80 via a connector.

The invention claimed is:

1. A method for manufacturing an optical transmission structure, comprising:
    preparing a substrate comprising a through hole penetrating therethrough in a thickness direction thereof;
    filling a photosensitive material into the through hole;
    exposing a region of the photosensitive material filled other than a region thereof in overlapping relation with a plurality of light-shielding portions to light through a light-transmitting plate comprising the plurality of light-shielding portions;
    removing the region of the photosensitive material in overlapping relation with the plurality of light-shielding portions; and
    filling a core member made of a light-transmitting material which has a refractive index larger than the photosensitive member exposed to light into an optical waveguide hole, the optical waveguide hole being formed by removing the photosensitive material and penetrating the photosensitive material in the thickness direction.

2. The method for manufacturing an optical transmission board according to claim 1, wherein, in the step of preparing the substrate, a plurality of the through holes are formed in the substrate.

3. A method for manufacturing an optical transmission structure, comprising:
    preparing a substrate comprising a plurality of through holes penetrating therethrough in a thickness direction thereof;
    filling a photosensitive material into at least one of the plurality of through holes;
    exposing a region of the photosensitive material filled other than a region thereof in overlapping relation with the light-shielding portion to light through a light-transmitting plate comprising a light-shielding portion;
    forming the optical waveguide hole penetrating the photosensitive material in the thickness direction in the cladding member by removing the region of the photosensitive material in overlapping relation with the light-shielding portion; and
    filling a core member made of a light-transmitting material which has a refractive index larger than the photosensitive member exposed to light into the optical waveguide hole, the optical waveguide hole being formed by removing the photosensitive material and penetrating the photosensitive material in the thickness direction.

4. The method for manufacturing an optical transmission structure according to claim 1, further comprising:
    heating the photosensitive material exposed to light, between the step of exposing the photosensitive material to light and the step of removing the photosensitive material.

* * * * *